Patented May 8, 1945

2,375,520

UNITED STATES PATENT OFFICE 2,375,520

MANUFACTURE OF IRON AND STEEL

James J. Bowden and John S. Suda, Warren, Ohio

No Drawing. Application February 5, 1944, Serial No. 521,269

5 Claims. (Cl. 75—55)

This invention relates to the manufacture of iron and steel, and more particularly to the preparation of the lime-supplying charge constituting the fluxing agent such as is employed in open hearth furnaces and blast furnaces. As is well known to those skilled in the processes of manufacturing iron and steel, the use of limestone as a fluxing agent is largely due to the fact that it constitutes readily accessible and available means for introducing lime into these processes.

Our invention has for its general object to provide a lime-supplying charge of such nature as will decrease the amount of calcining and, therefore, the time element involved in the open hearth and blast furnace processes.

We accomplish this object by utilizing, as part of the lime-supplying charge, a proportion of calcium hydrate, the proportion of the same to the total lime-supplying charge being governed by the considerations to be discussed hereinafter, it being noted that a lime-supplying charge wherein calcium hydrate is used as a source of lime is more basic than a charge consisting of limestone alone.

In our application No. 268,118, filed April 15, 1939, there is disclosed a method of treating limestone whereby a certain proportion of the same is converted into basic calcium carbonate ($2CaO.CO_2$), the latter, when used with water, constituting a binding agent whereby the mixture of the same with limestone can be compacted into briquettes. In the file of said application, there is a quotation from Alfred B. Searle's book entitled "Limestone and Its Products, Their Nature, Production and Uses," wherein it is stated that when this basic calcium carbonate is finely powdered it hardens like cement and forms $CaCO_3.Ca(OH)_2$, which could be used as a source of calcium hydrate and at the same time furnish binding qualities.

Our preferred manner of utilizing calcium hydrate herein as part of the lime-supplying charge is as follows: We crush limestone (whether fossiliferous, amorphous or dolomitic) to a size wherein the largest particles will pass through a one-inch mesh screen and a large proportion through a 40-mesh screen, and then mix these particles thoroughly with calcium hydrate and cement in the presence of water. The calcium hydrate and cement will be thoroughly mixed with the crushed limestone in proportions varying by weight as follows:

| | Parts |
|---|---|
| Limestone | 9 to 90 |
| Cement | 1 to 15 |
| Calcium hydrate | 9 to 98 |

This mixture can thereafter be compacted into briquettes wherein both the calcium hydrate and the cement serve as binding agents and whereby the briquettes will possess ample crush-resistant properties to enable them to be substituted for the ordinary limestone in open hearth furnaces and blast furnaces. The briquettes which we prefer to make are approximately of the size and shape of paving bricks.

Briquettes produced in the manner described herein possess fluxing qualities far superior to those possessed by ordinary limestones, being much more readily disintegrated and much more readily soluble in slag than is the case with limestones. Furthermore, according to the proportion of calcium hydrate that can be incorporated as part of the lime-supplying charge, the amount of calcination to which said charge is subjected will be decreased, since calcium hydrate is more readily converted into CaO than is limestone.

By crushing the limestone and forming the same into crush-resistant briquettes with calcium hydrate and cement, the rate at which calcination of the lime-supplying constituents takes place is greatly increased over the rate at which calcination occurs where ordinary limestone is employed as the lime-supplying charge. This is due to the fact that, in order for calcination to occur, there must be a means for escape of $CO_2$. In the ordinary lime-supplying charge, this escape is resisted and retarded by the size of the lumps or masses of limestone and by the very structure of the limestone of which these lumps or masses are composed. Where briquettes constructed in the manner described herein are utilized for the lime-supplying charge, they will spall or shatter, long before the pressure of the $CO_2$ therein can approximate that which is built up within ordinary limestone, especially when coated with di-calcium silicate, as outlined hereinafter, whereby our briquettes provide means for permitting the escape of the $CO_2$ under comparatively low pressure. Furthermore, the small size of the particles or fragments which are produced by the spalling or shattering of our briquettes renders them much more quickly soluble than are the lumps or masses of ordinary limestone.

Still further, in the open-hearth process, the lumps or masses of the ordinary limestone upon rising into or floating on the slag become coated with di-calcium silicate which has a melting point of 2130° C and which seals the lumps or masses against free emission of carbon dioxide, thereby causing a corresponding building up in the pressure of $CO_2$ within said lumps or masses, effectively slowing up or even stopping the calcination of the stone and the solution of the lime bearing material into the slag, making it necessary, either to use fluorspar or some other lower melting point fluxing material in order to assist the fluxing of the di-calcium silicate, or to consume a much longer furnace time in getting the di-calcium silicate into solution with the aid of the slower acting ferrites in the slag. Both of these methods are undesirable from the standpoint of quality control of the practice.

On the other hand, while the particles or fragments of the briquettes made in accordance with our invention are also coated with di-calcium silicate in the same manner as are the lumps or masses of limestone, nevertheless, when the pressure, resulting from the carbon di-oxide released in calcination, is exerted, the briquettes are shattered, thus facilitating the solution of the lime-bearing material in the slag.

Where briquettes are formed from a mixture of limestone with calcium hydrate and cement, as pointed out herein, the expansion of the cement under heat facilitates the shattering of the briquettes and the subsequent fusion or solution of the lime supplying ingredients thereof.

Still further, the calcium hydrate which has been thus incorporated with the limestone has more available CaO than that of limestone, due to the fact that we can obtain 76% of CaO from the former whereas, when using pure limestone, we can obtain only 56% CaO therefrom. Hence, an increase of 10% in calcium hydrate in a mixture of calcium hydrate and limestone will yield an increase of 2% in the average CaO, with a corresponding increase in basicity and saving in time and fuel consumption.

While it is true that the greater the proportion of calcium hydrate to limestone in the lime-supplying agent, the greater will be the saving in time and fuel consumption, nevertheless the proportion of calcium hydrate to limestone will necessarily be governed by the availability of the former. Such a source of supply of calcium hydrate exists in the plants employed in the manufacture of acetylene from calcium carbide, since calcium hydrate $Ca(OH)_2$ is produced in such manufacture as a waste product. As is well known, calcium hydrate $Ca(OH)_2$ will, if exposed to weather conditions, be gradually converted into $CaCO_3$. Hence, in order to obtain the most efficient results in using $Ca(OH)_2$ produced as a by-product of the manufacture of acetylene, such use should be made promptly after its production. The presence of a small proportion of $CaCO_3$ in this waste product would not render it objectionable for our purpose. Obviously, if a plant for manufacturing acetylene from calcium carbide were conveniently accessible to a plant engaged in the manufacture of iron or steel, the cost of calcium hydrate for the latter plant would be inconsiderable.

The percentages of calcium hydrate specified herein are percentages of the same devoid of water. Of course, where the calcium hydrate utilized is in the form of milk of lime, the actual calcium hydrate $Ca(OH)_2$ content thereof is utilized in computing the percentage of the latter to the limestone.

The furnace charge as prepared in the manner set forth herein facilitates the lime boil and is believed to initiate the same at a materially earlier stage in the process of manufacturing open hearth furnace iron and steel than is the case where ordinary limestone alone constitutes the lime supplying charge. The cement not only aids in the formation of our new furnace charge into crush-resistant briquettes but, as pointed out in our Patent No. 2,283,622, issued May 19, 1942, constitutes a source of alumina which contributes to the more rapid fusion of the limestone and operates efficiently to control the $Fe_2O_3$ phase of the final slag.

In the blast furnace process, calcination of the limestone proceeds in the same manner as in the open hearth process, namely; $CaCO_3$ plus heat equals CaO plus $CO_2$. In addition, where calcium hydrate, instead of limestone, is used in the blast furnace process, more iron can be made with less fuel since, in order to calcine limestone, temperatures from 975° C. to 1100° C. are required, whereas calcium hydrate decomposes at 580° C., the temperatures noted being taken at atmospheric pressure. Hence, as is the case with the open hearth process, to the extent that the calcium hydrate is employed in admixture with the limestone and cement, a corresponding saving in time and fuel consumption will be effected.

While it is evident that the greater the proportion of the cement in the briquettes the greater will be the ability of the briquettes to withstand crushing strains and stresses, nevertheless a proportion of cement in excess of 5 or 6% by weight in the briquettes will usually prove uncommercial. In practice, a proportion of from 3% to 5% of cement has ordinarily proved sufficient to yield satisfactory results.

This application is a continuation in part of our application Serial No. 477,620, filed March 1, 1943.

Having thus described our invention, what we claim is:

1. A fluxing agent suitable for use in the production of iron and steel, the same consisting essentially of a bonded mixture of limestone with calcium hydrate and cement.

2. A fluxing agent suitable for use in the production of iron and steel, the same consisting essentially of a bonded mixture of particles of limestone with cement and calcium hydrate in substantially the following proportions by weight:

|  | Parts |
|---|---|
| Limestone | 90 to 9 |
| Cement | 15 to 1 |
| Calcium hydrate | 98 to 9 |

3. A fluxing agent suitable for use in the production of iron and steel, the same consisting essentially of a bonded mixture of particles of limestone with cement and calcium hydrate in substantially the following proportions by weight:

|  | Parts |
|---|---|
| Limetsone | 88 to 47½ |
| Cement | 5 to 3 |
| Calcium hydrate | 47½ to 9 |

4. The fluxing agent set forth in claim 2 being formed into crush resistant briquettes.

5. The fluxing agent set forth in claim 3 being formed into crush resistant briquettes.

JAMES J. BOWDEN.
JOHN S. SUDA.